United States Patent [19]

Mostev et al.

[11] 3,955,014

[45] May 4, 1976

[54] METHOD OF MAKING ALKALI BATTERY SEPARATORS

[75] Inventors: Rafail Velislavov Mostev; Hrisanta Nicolaeva Budevska; Latinca Tantilova Ivanova, all of Sofia, Bulgaria

[73] Assignee: Zlehit pri Ban, Sofia, Bulgaria

[22] Filed: May 31, 1974

[21] Appl. No.: 474,919

Related U.S. Application Data

[63] Continuation-in-part of Ser. No. 216,244, Jan. 7, 1972, abandoned.

[52] U.S. Cl.................................. 427/54; 136/143; 204/159.23; 427/58; 427/301; 427/322; 427/341; 427/370; 427/400
[51] Int. Cl.² ...................... B05D 3/06; H01M 2/16
[58] Field of Search............... 117/93.31, 47 A, 118, 117/138.8 E, 161 UZ, 161 UH; 136/143; 8/DIG. 12, DIG. 18; 204/159.17, 159.23; 427/54, 58, 301, 322, 341, 370, 400

[56] References Cited

UNITED STATES PATENTS

| | | | |
|---|---|---|---|
| 3,014,799 | 12/1961 | Oster .............................. | 8/DIG. 18 |
| 3,088,791 | 5/1963 | Cline et al. ...................... | 117/93.31 |
| 3,090,664 | 5/1963 | Cline et al. ...................... | 8/DIG. 18. |
| 3,322,661 | 5/1967 | Yoshikawa et al. ........... | 204/159.17 |
| 3,427,206 | 2/1969 | Scardaville et al. ............. | 117/93.31 |

*Primary Examiner*—J. H. Newsome

[57] ABSTRACT

A method of obtaining alkaline battery separators. Such method comprises ultraviolet irradiation in the presence of a sensitizer and oxygen contained in the air of low density polyethylene film at ambient temperature and normal pressure to effect cross-linking and subsequently graft polymerizing an ethylenically unsaturated carboxylic acid monomer into the irradiated film under the action of heat and compression of the film.

10 Claims, No Drawings

METHOD OF MAKING ALKALI BATTERY SEPARATORS

This application is a continuation-in-part of the application Ser. No. 216,244, filed Jan. 7, 1972 now abandoned.

The present invention relates to a method for producing alkaline accumulator battery separators based on grafted polyethylene films.

A method for producing polyethylene separators for silver-zinc batteries is known making use of gamma-ray irradiation cross-linking (U.S. Pat. No. 3,427,206, Feb. 2, 1969). The disadvantage of this method is the use of powerful (high energy) gamma-ray sources (from 15,000 to 50,000 rads/hour), and high irradiation doses, ranging to $30 \times 10^6$ rads and time of irradiation from 20–100 hours.

A method for producing copolymers of acrylic acid and polyethylene is known making use of Van de Graaf accelerator irradiation up to $0.4 \times 10^6$ rads, grafting in the absence of air. U.S. At. Energy Commissioner TIO-7643,398 (1962), Chem. Abstr. 58,5835 e, (1963). The disadvantage of this method is the need of high energy irradiation sources and a vacuum supplying outfit for air removal during the grafting process, thus substantially complicating the technology and reducing the productivity of the installation.

Other methods for obtaining separators are also known involving grafting acrylic acid to polyethylene film. The grafting process is enhanced by gamma-ray irradiation throughout the process (F. Fydelor et al., Power Sources Symposium, Brighton, England, 1970, p. 327). The disadvantage of this method is the substantial loss of monomer due to homopolymerization of the methacrylic acid.

The high energy ionization radiation sources previously applied in the grafting of polyolefines generate highly reactive but short-living free radicals. To make use of their reactivity in the grafting process it is necessary either to irradiate the polymer-monomer system during the grafting stage (U.S. Pat. No. 3,427,206, Feb. 2, 1969) or to irradiate and keep the irradiated film at low temperatures (e.g. at 0 to 80°C) before the subsequent grafting stage (U.S. Pat. No. 3,088,791, Feb. 6, 1959). In order to increase the efficiency of the irradiation process during grafting, care is taken to eliminate all traces of oxygen by evacuation of the grafting vessel and/or by flooding it with an inert gas (Proceedings of the Symposium on Battery Separators, Columbus, Ohio, Feb. 18–19, 1970, page 303).

The object of the present invention is to provide a novel method for producing high quality alkaline battery separators based on grafted polyethylene by means of a simple technique, eliminating the hazardous high energy ionization radiation, and ensuring high productivity and low consumption of monomer and energy for irradiation and grafting.

According to the present invention, this task is solved by cross-linking the low-density polyethylene film by ultra-violet light irradiation in the presence of a sensitizer and oxygen (air). The irradiation proceeds at ambient temperature, and normal air pressure. To effect the graft polymerization the irradiated film is sandwiched with a porous web spacer, such as filter paper or cheese cloth, either by winding in a roll on a cylinder or by stacking in a rack in such a manner that the film is sufficiently strongly compressed against the cloth or paper during the grafting process. The sandwiched film is then soaked with the monomer of an ethylenically unsaturated carboxylic acid, for example methacrylic acid or its solutions in benzene, toluene, or xylene. The soaked sandwiched film is then heated at a temperature of 70°–90°C for 50-20 min., after which the film is washed with water, and then converted to its potassium form by treating it in a solution of KOH and again rinsed with water and dried.

An important feature of the present invention is that irradiation takes place in the presence of oxygen at ambient temperature, whereby the free-radicals are rapidly converted to peroxides and hydroperoxides. The latter are less reactive than the free radicals, but have the advantage of being more stable. Thus the grafting process can be carried out successfully even if the irradiated film is kept up to 100 hrs. at ambient temperature after the irradiation. The capability of the peroxides to initiate graft polymerization is enhanced through the elevated temperature and the compression of the film employed in the present invention.

The advantages of the invention are as follows: reduced time and energy or irradiation; use of simple and low cost apparatus; the process proceeds under ambient temperature and atmospheric air pressure; no use is made of high energy irradiation whereby operational hazards are eliminated.

The invention will be illustrated by the following examples:

EXAMPLE 1

An alkaline battery separator is prepared as follows:

A $30 \pm 10$ microns film of low density polyethylene ($d = 0.920 \pm 0.005$ g/cm$^3$) with a melting index 2 gr/10 min. is wetted by a 6% (wt) solution of benzophenone in toluene. The film is irradiated by ultraviolet lamp radiating chiefly in the 250–400 nm band with an input power $2 \pm 0.5$ kW per each square of the irradated film at ambient temperature and normal air pressure at a distance of $20 \pm 10$ cm for about 6 min. The irradiated film is then washed to free it of the sensitizer by successive rinsing with ethylic alcohol and water, after which it is dried.

The irradiated film is then rolled up along with a porous web such as filter paper or cheese cloth with a width exceeding that of the film on a cylindrical core made of corrosion resistant material such as glass, stainless steel, or aluminium. The stretching force exerted on the cloth during the rolling should be not less than 1.0 kg/cm so that the film in the roll is subjected to a compression against the cloth of not less than 0.5 kg/cm$^2$ throughout the subsequent grafting process.

The sandwiched roll is then bandaged tightly by a cellulosic ribbon and placed in a vessel where it is soaked for 60 min in freshly distilled methacrylic acid at ambient temperature, whereby the monomer penetrates completely into the cloth. The grafting process is performed at $85 \pm 2$°C for 30 min. After grafting the roll is uncoiled and the film is rinsed with water, after which it is treated in 40% (wt) KOH solution at 60° for 15 min. After washing in hot water, the film is dried at $30 \pm 10$° C by stretching it on a frame or on rolls in such a way that its final thickness after drying is $50 \pm 5$ microns. The graft level of the copolymer is 35–40% by wt.

The separator thus produced has the following characteristics:

| | |
|---|---|
| Thickness in dry state | 50 ± microns |
| Electric resistance in 40% by wt KOH at 22° C | 0.07 ± 0.01 ohm. cm² |
| Diffusion of zincate ions at 22°C | 2 × 10⁻⁸ cm²/sec |
| Tensile strength in wet condition | 60 ± 5 kg/cm² |
| Decrease of tensile strength after 96 hours at 90° in 40% (wt) KOH + 1% (vol) H₂O₂ | 8 ± 2% |

EXAMPLE 2

The separator is prepared essentially as in Example 1 except that the grafting process proceeds in a 70% (vol) toluene solution of methacrylic acid instead of in 100% methacrylic acid. The graft level of the copolymer is 45–50% (wt). The separators thus prepared have essentially the same characteristics as those in Example 1 except that their electric resistance is $0.06 \pm 0.01$ ohms. cm² and the tensile strength in wet condition is $50 \pm 5$ kg/cm.

EXAMPLE 3

The separator is prepared essentially as in Example 1 except that the grafting process proceeds in a 50% (vol) toluene solution of methacrylic acid instead of in 100% methacrylic acid. The graft level of the copolymer is 30–35% (wt). The separators thus prepared have essentially the same characteristics as those in Example 1 except that the electric resistance is $0.10 \pm 0.02$ ohm. cm² and the tensile strength in wet condition is $70 \pm 5$ kg/cm².

EXAMPLE 4

The film is irradiated as in Example 1, 2 or 3, but the grafting process is carried out as follows: Sheets of the irradiated film are stacked with cheese cloth or filter paper spacers in a pack. The pack is soaked in methacrylic acid or its solution in toluene and the pack is compressed with a pressure of $0.6 \pm 0.2$ kg/cm² in a rack either mechanically or by means of compressed air. The compression is maintained throughout the subsequent grafting process which is carried out at $85 \pm 2°C$ for 20–30 min. The grafted film is then alkalized, washed, and dried as in Example 1.

The graft level of the copolymer is 40–45% (wt). The separators thus obtained have essentially the same characteristics as those in Example 1, 2 or 3 respectively.

EXAMPLE 5

The separator is prepared essentially as in Example 1 except that the time of irradiation is $10 \pm 1$ min instead of about 6 min. The graft level of the copolymer is 45% (wt). The separators thus obtained have the same characteristics as in Example 1 except that the zincate diffusion across the separator is $0.6 \times 10^{-8}$ cm²/sec.

EXAMPLE 6

The separator is prepared essentially as in Example 1 except that the grating temperature is $75 \pm 2°C$ instead of $85 \pm 2°C$ and the duration of the grafting process is 40–50 min instead of 20–30 min. The graft level of the copolymer is 35% (wt). The separators thus obtained have the same characteristics as in Example 1 except that their resistance is 0.15 ohm. cm².

Although the invention is illustrated and described with reference to a plurality of embodiments thereof, it is to be expressly understood that it is in no way limited by the disclosure of such a plurality of embodiments, but is capable of numerous modifications within the scope of the appended claims.

What is claimed is:

1. A method of producing alkaline battery separators comprising ultraviolet irradiating a low-density polyethylene film in the presence of a sensitizer and air at ambient temperature and normal pressure, grafting the irradiated film in the absence of any reducing agent with an ethylenically unsaturated carboxylic acid monomer at a temperature of 70°–90°C in the absence of irradiation while the film is under compression of at least 0.5 kg/cm² and is sandwiched with a porous web spacer, and converting the grafting film to its potassium form.

2. A method according to claim 1, wherein the film is cross-linked by irradiation with an ultraviolet source radiating basically in the 250–400 nm band with an input power of $2 \pm 0.5$ kW per square meter of the irradiated film at a distance of $20 \pm 10$ cm for a period of 4–12 min.

3. A method according to claim 1, wherein the sensitizer is a 2–6% by weight benzophenone solution in toluene.

4. A method according to claim 1, wherein the polyethylene film is 20–50 microns thick.

5. A method according to claim 1, wherein the compression of the film necessary for the grafting process is created by tightly rolling up the irradiated film along with a porous web on a cylinder with a streching force of at least 1.0 kg/cm.

6. A method according to claim 1, wherein the compression necessary for the grafting process is created by subjecting a pack of irradiated polyethylene sheets in a stack with porous web spacers to a pressure of at least $0.6 \pm 0.2$ kg/cm² throughout the grafting process.

7. A method according to claim 1, wherein the film is grafted at a temperature 70°–90°C for 50 to 20 min.

8. A method according to claim 1, wherein the ethylenically unsaturated caboxylic acid is 100% methacrylic acid.

9. A method according to claim 1, wherein the film is grafted in a 50–90% by volume solution of methacrylic acid in benzene, toluene, or xylene.

10. A method according to claim 1, wherein the grafted film is converted to its potassium form by treating it in 40% by volume solution for KOH for 15 min. at 60° C.

* * * * *